US010466410B2

(12) United States Patent
Chen et al.

(10) Patent No.: US 10,466,410 B2
(45) Date of Patent: Nov. 5, 2019

(54) BACKLIGHT DEVICE

(71) Applicant: Wuhan Tianma Micro-Electronics Co., Ltd., Wuhan (CN)

(72) Inventors: Jiang Chen, Wuhan (CN); Chao Dai, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 263 days.

(21) Appl. No.: 14/929,119

(22) Filed: Oct. 30, 2015

(65) Prior Publication Data

US 2016/0187568 A1 Jun. 30, 2016

(30) Foreign Application Priority Data

Dec. 25, 2014 (CN) .......................... 2014 1 0822680

(51) Int. Cl.
*F21V 8/00* (2006.01)

(52) U.S. Cl.
CPC ......... *G02B 6/0085* (2013.01); *G02B 6/0081* (2013.01); *G02B 6/0091* (2013.01)

(58) Field of Classification Search
CPC .............................. G02B 6/0085; G02B 6/0081
See application file for complete search history.

(56) References Cited

U.S. PATENT DOCUMENTS

| 2012/0188793 | A1* | 7/2012 | Shin | G09F 13/04 |
| | | | | 362/613 |
| 2013/0235612 | A1* | 9/2013 | Tang | G02F 1/1336 |
| | | | | 362/602 |
| 2017/0199316 | A1* | 7/2017 | Tomizawa | G02B 6/0068 |

FOREIGN PATENT DOCUMENTS

| CN | 201069502 Y | 6/2008 |
| CN | 202884674 U | 4/2013 |

* cited by examiner

*Primary Examiner* — Britt D Hanley
*Assistant Examiner* — Nathaniel J Lee
(74) *Attorney, Agent, or Firm* — Alston & Bird LLP

(57) ABSTRACT

A backlight device is disclosed. The backlight device includes a reflection sheet; a frame in contact with the reflection sheet; and a light guiding plate surrounded by the frame; wherein the frame comprises: a first surface in contact with the reflection sheet, a second surface spaced apart from the reflection sheet, at least one groove configured to secure a light emitting element, and a heat dissipation channel in at least one of the first surface and the second surface of the frame, wherein the heat dissipation channel is located at periphery of the groove.

10 Claims, 9 Drawing Sheets

BACKLIGHT DEVICE

CROSS-REFERENCES TO RELATED APPLICATION

This application claims priority to a Chinese patent application No. 201410822680.5 filed on Dec. 25, 2014 and entitled "Backlight Device", the disclosure of which is incorporated herein by reference in its entirety.

FIELD OF THE INVENTION

Generally, a backlight module is located below a liquid crystal display panel. The liquid crystal display panel as a passive light emitting element does not emit light by itself, instead, light is provided by a light emitting source within the backlight module located below the liquid crystal display device. The backlight module is assembled with the liquid crystal display panel to form a liquid crystal display module, and hence a display effect of the liquid crystal display module depends on the light emitting effect of the backlight module.

Typically, a plurality of the light emitting sources are provided in the backlight module and generate thermal radiation in emitting light. In the related art, cooling fins are often used to dissipate heat from the light emitting sources in the backlight module. FIG. 1A is a schematic view showing the structure of a backlight module in the related art. As shown in FIG. 1A, an extrusion type cooling fin 11 is provided in the backlight module and is in direct contact with a light emitting source 12. When the light emitting source 12 emits light, the cooling fin 11 absorbs heat radiation from the light emitting source 12 and then dissipates the heat, thereby realizing the effect of heat dissipation. FIG. 1B is a schematic view showing the structure of another backlight module. As shown in FIG. 1B, a cooling fin 21 is adhesively attached to the housing of a backlight module so as to realize the effect of heat dissipation.

However, in the related art, the cooling fins are embedded into the backlight module or adhesively attached to the housing of the backlight module, which may increase the thickness of the backlight module and hence obstruct the thinning tendency of the backlight module, and the efficiency of heat dissipation is low. Moreover, a process for adhesive attachment of the cooling fins is added, thereby increasing the fabrication cost.

BACKGROUND OF THE INVENTION

Embodiments of the present invention provide a backlight device, comprising: a reflection sheet; a frame in contact with the reflection sheet; and a light guiding plate surrounded by the frame; wherein the frame comprises: a first surface in contact with the reflection sheet, a second surface spaced apart from the reflection sheet, at least one groove configured to secure a light emitting element, and a heat dissipation channel in at least one of the first surface and the second surface of the frame, wherein the heat dissipation channel is located at periphery of the groove.

BRIEF DESCRIPTION OF THE DRAWINGS

In order to describe the technical solutions in the embodiments of the present invention, the accompanying drawings for the description would be described simply as follows. Apparently, the accompanying drawings described below are only exemplary, but not intended to limit the present invention. It is possible for those skilled in the art to obtain other drawings from the accompanying drawings without any creative labor.

DETAILED DESCRIPTION OF THE INVENTION

The present disclosure will be described in detail through embodiments below in conjunction with the accompanying drawings. It should be understood that specific embodiments described herein are merely for explaining the present disclosure rather than limiting the present disclosure. In addition, it should be noted that merely partial content associated with the present disclosure rather than all contents is illustrated in the accompanying drawings. Other embodiments derived by those skilled in the art without creative labor fall within the scope of the invention.

The technical solutions according to embodiments of the present disclosure can improve the heat dissipation efficiency of a display panel. Light emitting elements are provided in a frame of a display panel, and hence the structure of the frame is designed to improve the heat dissipation efficiency of the light emitting elements in the display panel by adding heat dissipation channels to the frame.

Figure 1A:
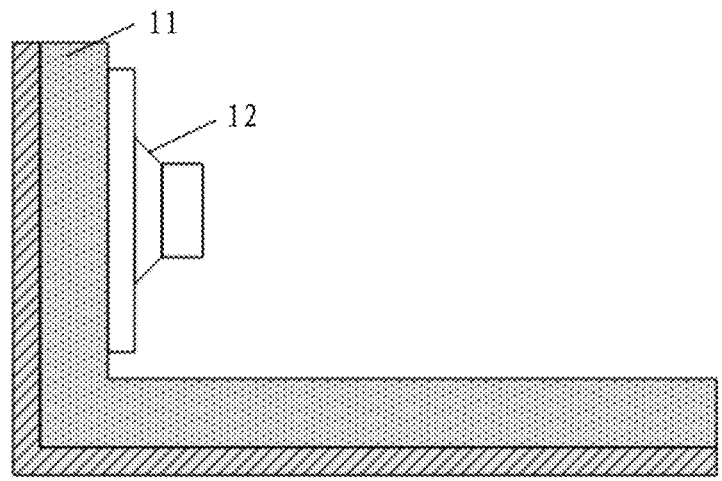
FIG. 1A is a schematic view showing the structure of a backlight module in the related art.
Figure 1B:
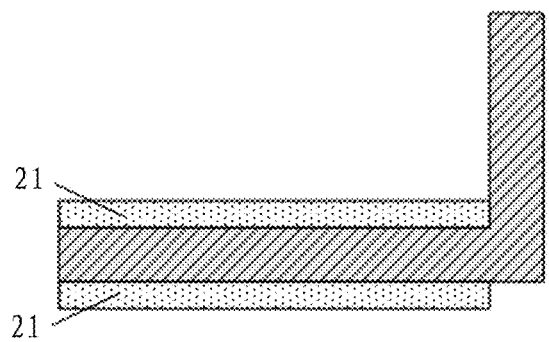
FIG. 1B is a schematic view showing the structure of another backlight module in the related art.
Figure 2A:
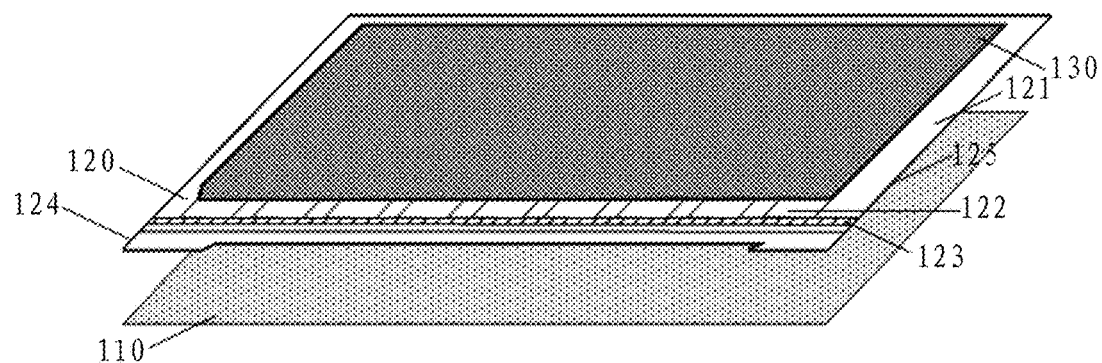
FIG. 2A is a view showing the structure of a backlight device according to an embodiment of the present disclosure.

As shown in FIG. 2A which is a structural view of a backlight device according to an embodiment of the present disclosure, the backlight device includes a reflection sheet 110, a frame 120 in contact with the reflection sheet 110, and a light guiding plate 130 surrounded by the frame 120, where the frame 120 includes a first surface in contact with the reflection sheet 110 and a second surface 121 away from the reflection sheet 110; and the frame 120 further includes: at least one groove 122 for securing a light emitting element, and a heat dissipation channel 123 which is provided on at least one of the first surface and the second surface 121 of the frame 120, where the heat dissipation channel 123 is located at the periphery of the groove 122.

The backlight device and the light emitting element as described above form a backlight module which is one of essential parts in the liquid crystal display device, and the backlight module is located below a liquid crystal display panel of the liquid crystal display device. The liquid crystal display panel does not emit light by itself, but light is provided by the light emitting element in the backlight module located below the liquid crystal display panel, and a light source with sufficient and evenly distributed luminance is obtained for the liquid crystal display panel by optical film sheets such as the reflection sheet 110 and the light guiding plate 130, so that the light emitted from the light emitting element is modulated in the liquid crystal display panel to implement displaying of images by the liquid crystal display device. As known from the above, in the liquid crystal display device, light is emitted by the light emitting elements disposed within the backlight device, and is intensified in the backlight device in order to improve the luminance and the luminous efficiency, and eventually the light exits from the display panel. The light emitting elements and the backlight device are independent of each other in the liquid crystal display device. Generally a plurality of the light emitting elements are packaged in the backlight device, and the visual effect in the liquid crystal display panel is directly influenced by light emitted by the backlight module. In this embodiment, the light emitting element may be a light-emitting diode (LED).

In this embodiment, as shown in FIG. 2A, the backlight device includes a frame 120 which includes a plurality of grooves 122 therein for receiving the light emitting elements, and specifically for securing the plurality of light emitting elements. The frame 120 includes a first surface in contact with the reflection sheet 110 and a second surface 121 away from the reflection sheet 110. The backlight device also includes a reflection sheet 110, which is in contact with the first surface of the frame 120, and configured to receive a part of light emitted from the light emitting elements and reflect the part of the light along a direction towards the liquid crystal display panel, thus the function of the reflection sheet 110 is to improve the light utilizing efficiency of the light emitting elements. The backlight device further includes a light guiding plate 130 surrounded by the frame 120 and arranged opposite to the reflection sheet 110, and the light guiding plate 130 may be generally made of material with high light reflectivity and free of light absorption and is provided with a plurality of light diffusion sites. The light guiding plate 130 is configured to receive the light reflected by the reflection sheet 110 and direct the received light into the light guiding plate 130. When reaching the light diffusion sites, the light diffuses at different angles and eventually is emitted from the front surface of the light guiding plate 130. With the light diffusion sites having different closeness and sizes, the light guiding plate 130 can emit the light uniformly. As such, the light guiding plate 130 functions to direct the diffused light, so that the light can be sufficiently utilized and distributed uniformly.

In order to ensure the display effect of the liquid crystal display panel, a plurality of the light emitting elements are provided in the backlight module. When emitting the light, the light emitting elements usually emit thermal radiation due to their high temperature. The thermal radiation may cause a temperature increase of the peripheral air around the light emitting elements, and hence the temperature of the light emitting elements may be increased, leading to a failure of the light emitting elements, accelerated aging of a heat dissipation device, and a non-uniform temperature and a reduced service life of the light emitting elements. In order to improve the performance of the backlight device, in this embodiment, the frame 120 further includes at least one heat dissipation channel 123, which is provided on at least one of the first surface and the second surface 121 of the frame 120 and is in communication with the outside, so that the thermal radiation and hot air caused by the light emitting elements can be directed out by the heat dissipation channel 123. Moreover, considering that the light emitting element is located in the groove 122, the heat dissipation channel 123 may be located at the periphery of the groove 122, and in this case, when the light emitting element in the groove 122 emits heat radiation, the heat dissipation channel 123 located at the periphery of the groove 122 can be used to direct out the thermal radiation around the light emitting element and exchange the hot air with the outside air to facilitate the heat dissipation, so that the thermal radiation would not be accumulated around the light emitting elements. As compared with the backlight device in the related art, the heat dissipation channel 123 is simultaneously formed in forming the frame 120 in this embodiment, so that the thermal radiation emitted by the light emitting elements in the grooves 122 can be directly and rapidly directed out and the hot air in the groove 122 can be exchanged with the outside air, thus solving the technical problem of heat dissipation in the related art, while improving the heat dissipation efficiency of the backlight device.

Figure 2B:
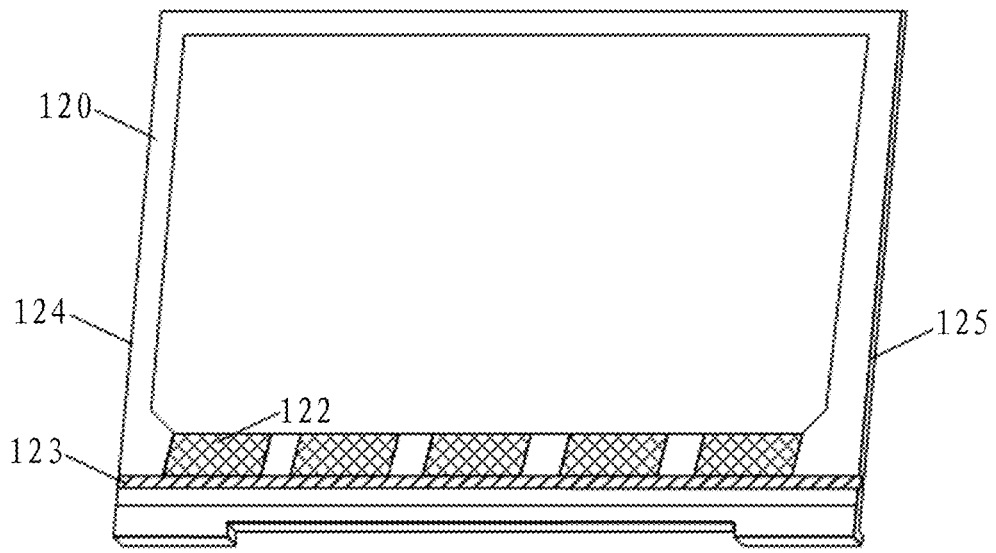
FIG. 2B is a schematic view showing the structure of a frame (i.e. adhesive frame) according to an embodiment of the present disclosure.

Referring to FIG. 2B which is a schematic view showing the structure of a frame according to an embodiment of the present disclosure, a plurality of light emitting elements (not shown) are secured in the grooves 122 of the frame 120. The light emitting elements may be arranged sequentially in the grooves 122, which are also arranged sequentially. The frame 120 is also used to accommodate a light guiding plate 130. More particularly, in the frame 120, the groove 122 for securing the light emitting element is opening at its side close to the light guiding plate 130, and thus the periphery of the groove 122 includes a left side region, a right side region and an underside region of the groove 122. Considering that the heat dissipation channel 123 is configured to direct the thermal radiation around the light emitting element to the outside of the frame 120 and exchange the hot air around the light emitting element with the outside air, the heat dissipation channel 123 is located at the periphery of the groove 122 accommodating the light emitting element, and preferably, the heat dissipation channel 123 is located below the groove 122, at the left side of the groove 122, or at the right side of the groove 122.

Since the heat dissipation channel 123 is located at the periphery of the groove 122 configured for securing the light emitting element in the frame 120, the thermal radiation generated by the light emitting element and the peripheral hot air around the light emitting element can be directed into the heat dissipation channel 123. If the heat dissipation channels 123 located at the periphery of the grooves 122 are independent of each other without communication with each other, the thermal radiation generated by the light emitting elements is still accumulated at the periphery of the grooves 122, and thus the temperature of the air at the periphery of the light emitting elements rises with the accumulation of the thermal radiation, and in a such case, the hot air cannot to be directed out of the backlight device, so that the hot air at the periphery of the groove 122 cannot exchange with the outside air. In order to solve the technical problem of directing out the thermal radiation emitted by the light emitting element, the heat dissipation channel 123 located at the periphery of the groove 122 for securing the light emitting element is extended to be open to the outside of the frame 120, so that the thermal radiation around the plurality of light emitting elements is transmitted through the heat dissipation channel 123 running across the frame 120 and is then directed out of the frame 120, and in this case, the hot air around the light emitting elements can convect with the outside air, that is, exchange with the air outside the frame 120 through the heat dissipation channel 123, so that the thermal radiation around the light emitting elements is directed out of the frame 120, thereby rapidly decreasing the temperature of the light emitting elements and further improving the heat dissipation efficiency. Therefore, the heat dissipation channel 123 runs across the frame 120 from the left side surface 124 of the frame 120 to the right side surface 125 of the frame 120. Here, the heat dissipation channel 123 is provided on at least one of the first surface and the second surface 121 of the frame 120, where the left side surface 124 of the frame 120 is located at the left side of the groove 122, and the right surface 125 of the frame 120 is located at the right side of the groove 122.

Figure 2C:
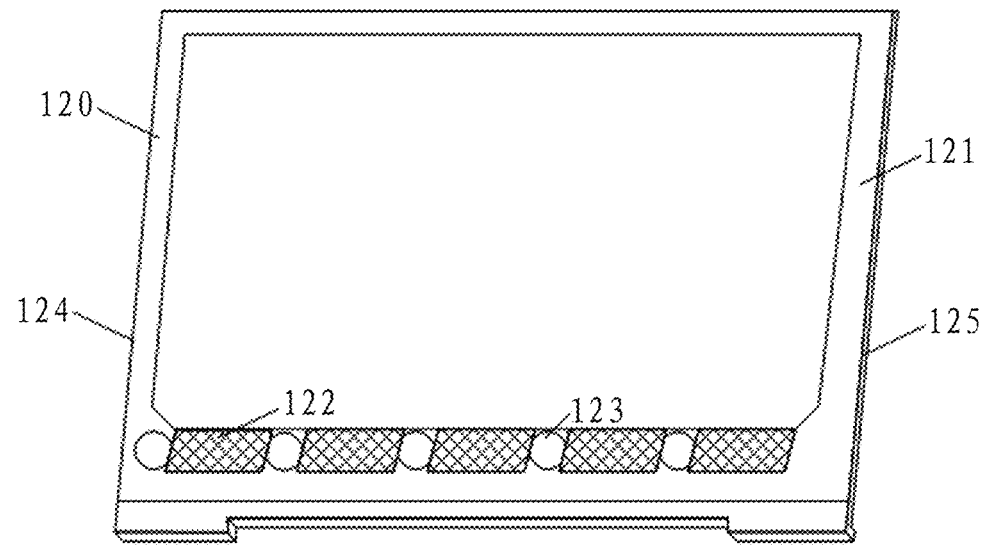
FIG. 2C is a schematic view showing the structure of another frame according to an embodiment of the present disclosure.

Here, as shown in FIG. 2C which is a schematic view showing the structure of another frame according to an embodiment of the present disclosure. In the case that the heat dissipation channel 123 does not run across the frame 120 from the left side surface 124 to the right side surface 125 of the frame 120, given that the peripheral region of the groove 122 on the second surface 121 of the frame 120 is uncovered, a heat dissipation channel 123 which perforates through both the first surface and the second surface 121 of the frame 120 may be arranged at the periphery of the groove 122, in order to direct out the thermal radiation of the light emitting element, as shown in FIG. 2C. In this case, the thermal radiation around the light emitting element may be directed out of the frame 120 through the heat dissipation channel 123 located at the periphery of the groove 122, and the hot air around the light emitting element may directly exchange with the outside air through the heat dissipation channel 123, to facilitate the heat dissipation. It is noted that, the heat dissipation channels 123 located at the periphery of the grooves 122 can be independent of each other or can be in communication with each other. Preferably, the heat dissipation channel 123 perforates through both the first surface and the second surface 121 of the frame 120.

Moreover, in order to optimally improve the heat radiation dissipation efficiency of the light emitting element, preferably, the heat dissipation channel 123 may run across the frame 120 from the left side surface 124 to the right side surface 125 of the frame 120, and perforate through the first surface and the second surface 121 of the frame 120. Through the heat dissipation channels 123 formed in the frame 120 as above, the thermal radiation of the light emitting element around the light emitting element can be directed out of the frame 120 and the hot air around the light emitting element can be convected or exchanged with the outside air, through the heat dissipation channel 123 corresponding to the light emitting element that is located at the periphery of the groove 122, runs across the frame 120 and perforates through the frame 120, to facilitate the heat dissipation, so that the effect of the heat dissipation is even improved.

In the backlight device according to the embodiments of the present disclosure, the heat dissipation channel 123 is provided in the frame 120 and integrally formed with the frame 120. Since the heat dissipation channel 123 can be shaped in the mold of the frame 120 without a separately designed mold, the thickness of the backlight device is not affected, and advantages such as simple process, low cost and thinning of the backlight device can be obtained. Furthermore, the frame 120 of the backlight device in the present embodiment is provided with a plurality of grooves 122, each of which accommodates a light emitting element, so that the light emitting elements are independent of each other. Additionally, the heat dissipation channel 123 in the present embodiment is in communication with the plurality of grooves 122 and runs across the frame 120 from the left side surface 124 to the right side surface 125 of the frame 120, so that the convection of the air in the grooves 122 is allowed to facilitate the heat exchange, thus improving the heat dissipation efficiency without adhesively attaching additional cooling fins or cooling glues to the frame 120, thereby eliminating the adhesive attachment process and reducing the manufacturing cost.

Figure 3A:
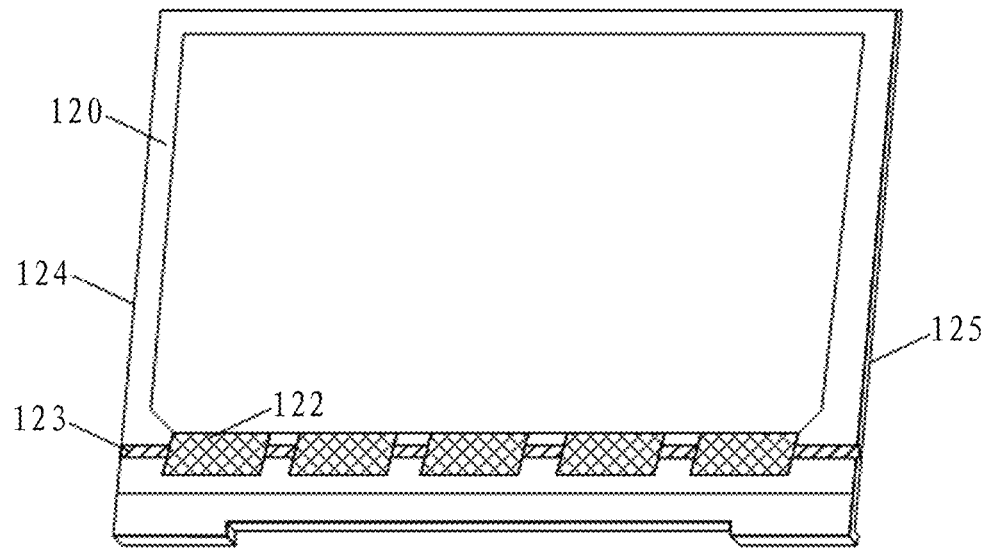
FIG. 3A is a schematic view showing the structure of a heat dissipation channel according to yet another embodiment of the present disclosure.

FIG. 3A is a schematic view showing the structure of a heat dissipation channel according to yet another embodiment of the present disclosure. As shown in FIG. 3A, the heat dissipation channel 123 can runs across the frame 120 from the left side surface 124 to the right side surface 125 of the frame 120, and more particularly, the heat dissipation channel 123 is present at both left and right sides of any of the grooves 122, and extends from the left side surface 124 to the right side surface 125 of the frame 120. In such configuration, since the heat dissipation channel 123 is present at both left and right sides of any of the grooves 122 and runs across the frame 120, the thermal radiation generated by each of the light emitting elements and hot air around the light emitting element can be directed to the left side and the right side of the groove 122 corresponding to the light emitting element, and thus the thermal radiation is directed out and air convection is realized. In the heat dissipation channel 123, the thermal radiation generated by adjacent light emitting elements raises the temperature of the air around the light emitting element, and the thermal radiation and the hot air are directed into the left side and the right side of the groove 122. Also, since the left side and the right side of each of the grooves 122 each are in communication with the outside, the hot air exchanges with the outside air via the heat dissipation channel 123 through the action of the air convection, so that the thermal radiation is directed out of the heat dissipation channel 123, thereby realizing the heat dissipation.

Figure 3B:
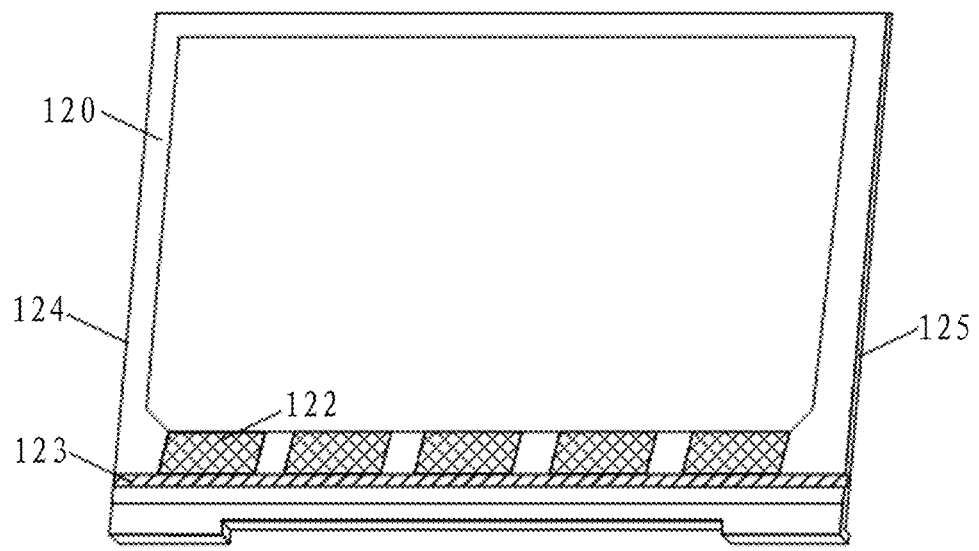
FIG. 3B is a schematic view showing the structure of a heat dissipation channel according to yet another embodiment of the present disclosure.

FIG. 3B is a schematic view showing the structure of a heat dissipation channel according to yet another embodiment of the present disclosure. As shown in FIG. 3B, the heat dissipation channel 123 runs across the frame 120 from the left side surface 124 of the frame 120 to the right side surface 125 of the frame 120. Specifically, the heat dissipation channel 123 is formed below the grooves 122, and runs across the frame 120 from the left side surface 124 to the right side surface 125 of the frame 120. As such, since the heat dissipation channel 123 is present below each of the grooves 122 and opens to the outside of the frame 120, when the light emitting elements emit light, the thermal radiation generated by the light emitting elements raises the temperature of the air around the light emitting elements, and then the thermal radiation and the hot air are directed into the underside of the grooves 122, so that the hot air convects with the outside air through the heat dissipation channel 123 running across the frame 120, as a result, the thermal radiation is directly directed out from the underside of the grooves 122 to the heat dissipation channel 123, to realize the heat dissipation.

Figure 3C:
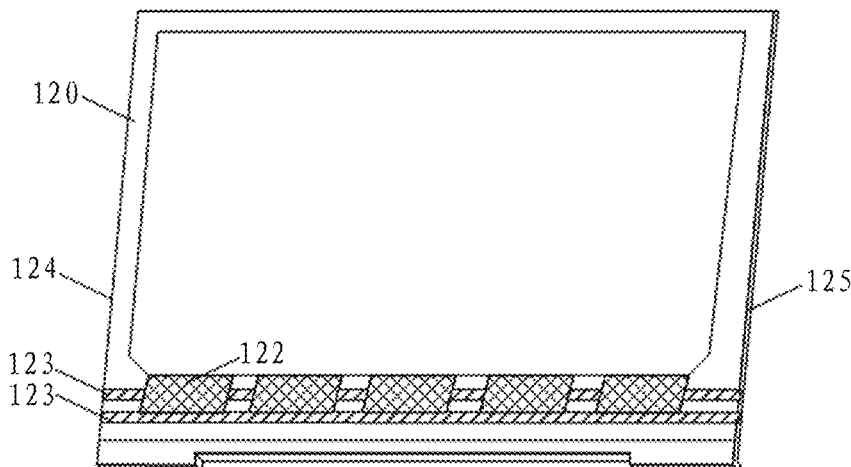
FIG. 3C is a schematic view showing the structure of a heat dissipation channel according to yet another embodiment of the present disclosure.

FIG. 3C is a schematic view showing the structure of a heat dissipation channel according to yet another embodiment of the present disclosure. As shown in FIG. 3C, the heat dissipation channels 123 runs across the frame 120 from the left side surface 124 to the right side surface 125 of the frame 120. Specifically, a heat dissipation channel 123 is present at both the left and right sides of the grooves 122 and runs across the frame 120 from the left side surface 124 to the right side surface 125 of the frame 120, and furthermore, a heat dissipation channel 123 is also formed below the grooves 122 and runs across the frame 120 from the left side surface 124 to the right side surface 125 of the frame 120. After thermal radiation is generated by the light emitting elements, the thermal radiation and the hot air around the light emitting element is directed to the left side, the right side, and the underside of the groove 122, thus the hot air exchanges with the outside air via the heat dissipation channels located below the groove 122, at the left side of the groove 122 and the right side of the groove 122, and the thermal radiation is directed out of the frame 120 through the heat dissipation channels 123, to realize the heat dissipation.

Figure 3D:
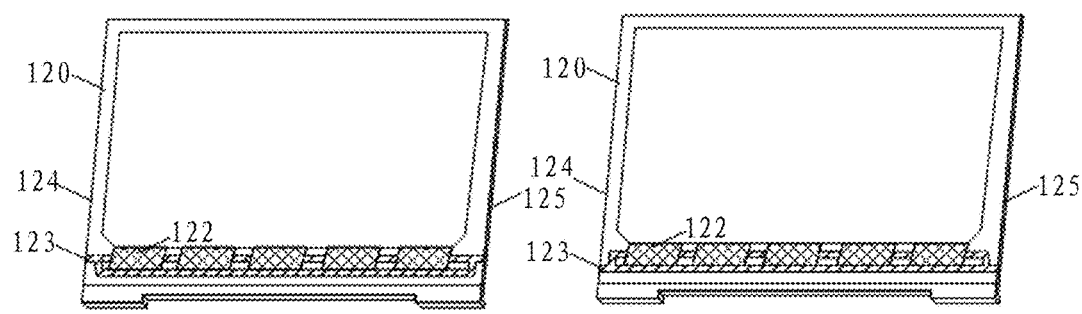
FIG. 3D is a schematic view showing the structure of a heat dissipation channel according to yet another embodiment of the present disclosure.

FIG. 3D is a schematic view showing the structure of a heat dissipation channel according to yet another embodiment of the present disclosure. As shown in FIG. 3D, the heat dissipation channels 123 are formed below the grooves 122 as well as at the left side and the right side of each of the grooves 122. Here, the heat dissipation channels 123 located at the left side and the right side of the grooves 122 are in communication with other. However, in the formed heat dissipation channels 123, an end of the heat dissipation channel 123 located below the groove 122 close to the left side surface 124 of the frame 120 is connected with an end of the heat dissipation channel located at the left side of the groove 122 which is closest to the left side surface 124 of the frame 120, to form a heat dissipation vent which opens at the left side surface 124 of the frame 120; also, an end of the heat dissipation channel located below the groove 122 close to the right side surface 125 of the frame 120 is connected with an end of the heat dissipation channel located at the right side of the groove 122 which is closest to the right side surface 125 of the frame 120, to form a heat dissipation vent which opens at the right side surface 125 of the frame 120. Thereby, the heat dissipation vent which opens at the left side surface 124 of the frame 120 is in communication with the heat dissipation vent which opens at the right side surface 125 of the frame 120. In an implementation, the heat dissipation vent which opens at the left side surface 124 of the frame 120 and the heat dissipation vent which opens at the right side surface 125 of the frame 120 both are connected and in communication with the heat dissipation channel 123 located below the groove 122, and thus the thermal radiation of the light emitting element can be directed out of the frame 120 from the left side, the right side and the underside of the groove 122, and the outside air can be directed into the frame 120 through the heat dissipation channel 123 located below the grooves 122 and running across the frame 120 from the left side to the right side of the frame 120 to convect with the hot air inside the frame 120, thereby realizing the heat dissipation. In an implementation, the heat dissipation vent which opens at the left side surface 124 of the frame 120 and the heat dissipation vent which opens at the right side surface 125 of the frame 120 both are connected and in communication with heat dissipation channel 123 located at the left side and the right side of the grooves 120, and thus the thermal radiation of the light emitting element can be directed out of the frame 120 from the left side, the right side and the underside of the groove 122, and the outside air can be directed into the frame 120 through the heat dissipation channel 123 located at the left side and the right side of the groove 122 and running across the frame 120 from the left side surface to the right side surface of the frame 120 to convect with the hot air, thereby realizing the heat dissipation.

Figure 3E:
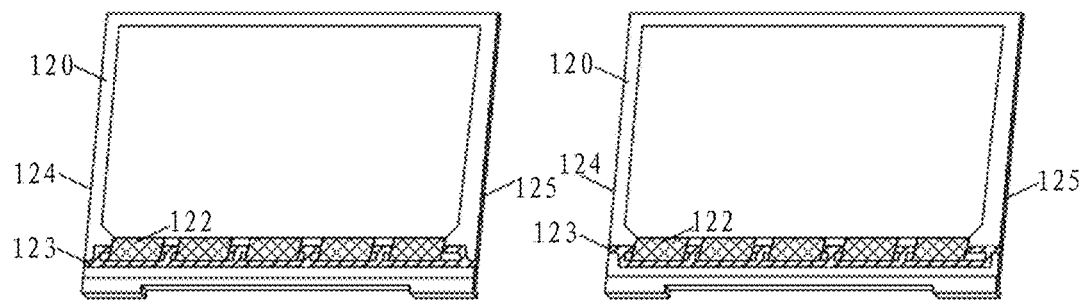
FIG. 3E is a schematic view showing the structure of a heat dissipation channel according to yet another embodiment of the present disclosure.

FIG. 3E is a schematic view showing the structure of a heat dissipation channel according to yet another embodiment of the present disclosure. As shown in FIG. 3E, the heat dissipation channels 123 are formed below the grooves 122 at well as at the left side and the right side of each of the grooves 122, where an end of the heat dissipation channel 123 located below the groove 122 close to the left side surface 124 of the frame 120 is connected with an end of the heat dissipation channel 123 located at the left side of the groove 122 close to the left side surface 124 of the frame 120 to form a heat dissipation vent which opens at the left side surface 124 of the frame 120, and an end of the heat dissipation channel 123 located below the groove 122 close to the right side surface 125 of the frame 120 is connected with an end of the heat dissipation channel 123 located at the right side of the groove 122 close to the right side surface 125 of the frame 120 to form a heat dissipation vent which opens at the right side surface 125 of the frame 120. Further, the heat dissipation channel 123 located below the grooves 122 is connected with the heat dissipation channels 123 located at the left side and the right side of each of the grooves 122. Here, after being directed into the heat dissipation channels 123 through the heat dissipation vents located at the left side surface 124 and the right side surface 125 of the frame 120, the outside air can convect with the hot air caused by the light emitting element through the heat dissipation channel 123 located below the corresponding groove 122, the heat dissipation channel 123 located at left side of the corresponding groove 122 and connected with the below heat dissipation channel 123, and the heat dissipation channel 123 located at the right side of the corresponding groove 122 and connected with the below heat dissipation channel 123, while the thermal radiation emitted by the light emitting element is also directed out of the frame 120 through the heat dissipation channels 123.

In this embodiment, the thermal radiation generated by the light emitting element can be directed out of the frame 120 through the heat dissipation channels 123 provided in the frame 120 and running across the frame 120 from the left side surface 124 to the right side surface 125 of the frame 120, and the hot air around the light emitting elements can exchange with the outside air via air convection so as to improve the heat dissipation efficiency of the light emitting elements.

Figure 4A:
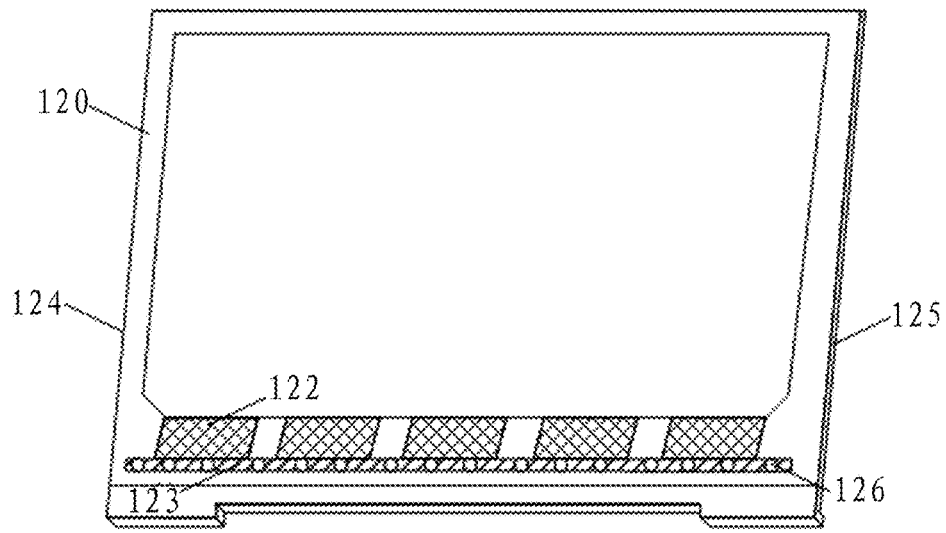
FIG. 4A is a schematic view showing the structure of a heat dissipation channel according to yet another embodiment of the present disclosure.

FIG. 4A is a schematic view showing the structure of a heat dissipation channel according to yet another embodiment of the present disclosure. As shown in FIG. 4A, the heat dissipation channel 123 is formed below the grooves 122 but does not run across the frame 120 from the left side surface 124 to the right side surface 125 of the frame 120, in this case, the hot air inside the heat dissipation channel 123 cannot exchange with the outside air, and the thermal radiation is accumulated inside the frame 120. In order to enable the hot air to exchange with the outside air rapidly, given that the second surface of the frame 120 is uncovered, heat dissipation vias 126 perforating through the first surface and the second surface 121 of the frame 120 are formed in the heat dissipation channel 123. The heat dissipation vias 126 formed in the heat dissipation channel 123 allow the hot air to convect with the outside air and direct the thermal radiation out of the frame 120. In this case, the hot air flowing in the heat dissipation channel 123 located below the grooves 122 can be directed out of the frame 120 and exchange with the outside air through the heat dissipation vias in the heat dissipation channel 123 located below the grooves 122, and hence the thermal radiation is also directed out of the frame 120. As shown in FIG. 4A, the heat dissipation channels 123 located below the grooves 122 for the light emitting elements may alternatively be independent of each other without connection therebetween, and in this case, at least one heat dissipation via 126 is provided in the heat dissipation channel 123 located below each of the grooves 122.

Figure 4B:
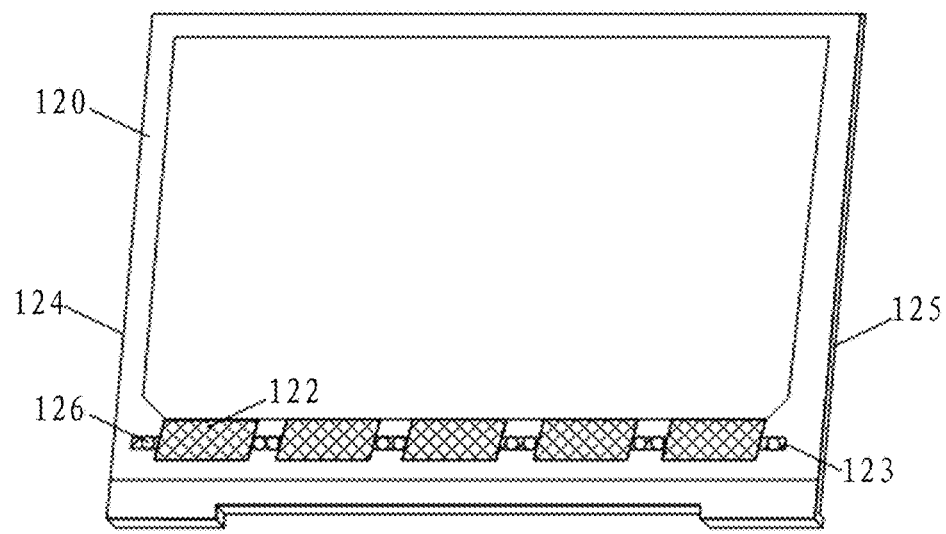
FIG. 4B is a schematic view showing the structure of a heat dissipation channel according to yet another embodiment of the present disclosure.
Figure 4C:
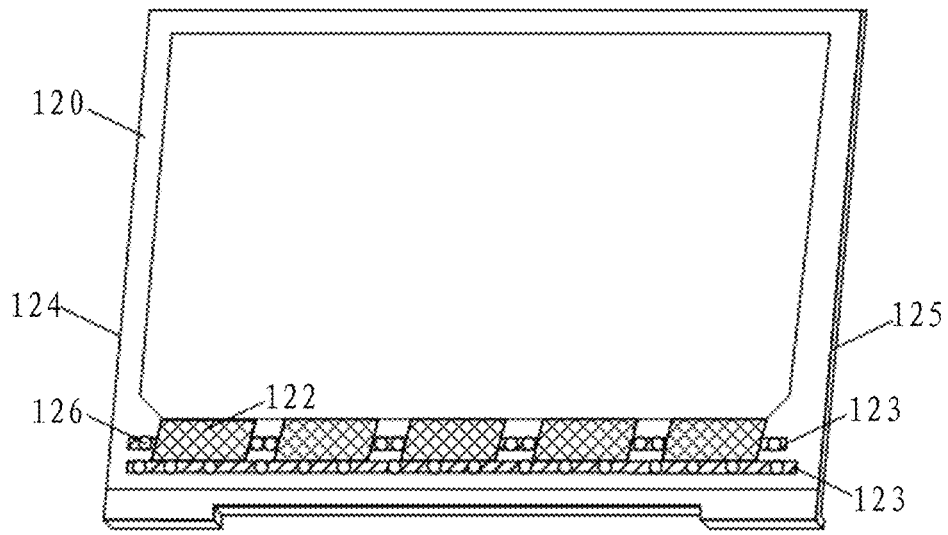
FIG. 4C is a schematic view showing the structure of a heat dissipation channel according to yet another embodiment of the present disclosure.

Unlike FIG. 4A showing that the heat dissipation channel 123 is formed below the grooves 122 and the heat dissipation vias are formed within the heat dissipation channel 123, FIG. 4B is a schematic view showing the structure of yet another heat dissipation channel according to an embodiment of the present disclosure. As shown in FIG. 4B, the heat dissipation channels 123 are formed at the left side and the right side of each of the grooves 122, and heat dissipation vias 126 perforating through the first surface and the second surface 121 of the frame 120 are formed within the heat dissipation channels 123. At least one heat dissipation via 126 is formed in the heat dissipation channel 123 located at either of the left side and the right side of the groove 122, so that the thermal radiation can be directed out of the frame 120 and the air convection can be implemented between the inside and outside of the frame 120, thereby facilitating the heat dissipation. As shown in FIG. 4C which is a schematic view showing the structure of yet another heat dissipation channel according to an embodiment of the present disclosure, heat dissipation channels 123 are formed below the grooves 122 as well as at the left and right sides of each of the grooves 122, and heat dissipation vias 126 penetrating through the first surface and the second surface 121 of the frame 120 are formed in the heat dissipation channels 123, where the periphery of each light emitting element includes at least one of the heat dissipation vias 126.

Figure 4D:
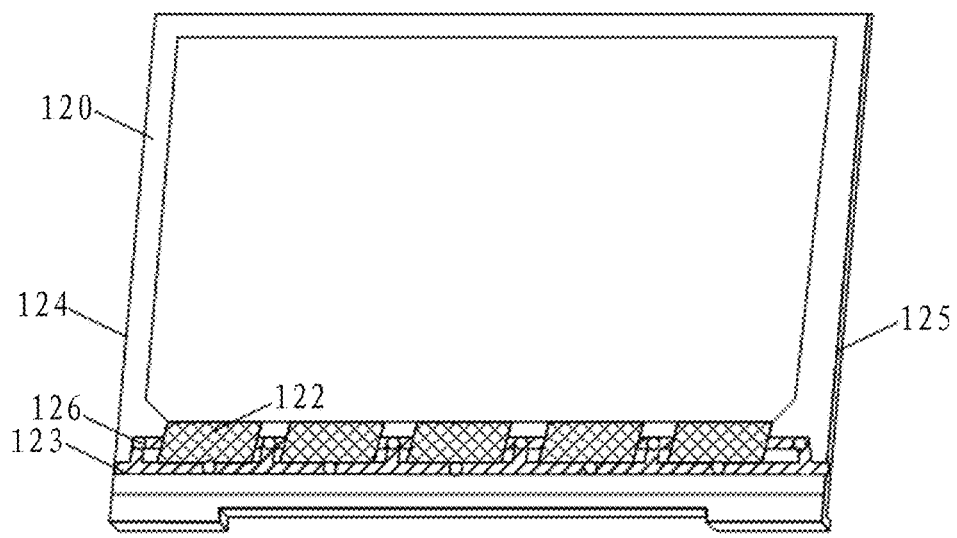
FIG. 4D is a schematic view showing the structure of a heat dissipation channel with a heat dissipation via according to yet another embodiment of the present disclosure.

FIG. 4D is a schematic view showing the structure of yet another heat dissipation channel with heat dissipation vias according to an embodiment of the present disclosure. Any of the heat dissipation channels 123 shown in FIGS. 3A to 3E implements exchanging of internal hot air with the outside air through heat dissipation vents opening to the outside of the frame 120, to direct the thermal radiation out of the frame 120 and facilitate the heat dissipation, and hence the effect of heat dissipation is realized. If at least one heat dissipation via 126 is provided in the heat dissipation channels 123 shown in FIGS. 3A to 3E, the heat dissipation efficiency is improved accordingly. Therefore, in an implementation shown in FIG. 4D, heat dissipation vias 126 penetrating through the first surface and second surface 121 of the frame 120 are formed in the heat dissipation channels 123, and the number of the heat dissipation vias 126 may vary with requirements of different users. For example, as for the heat dissipation channels 123 shown in FIG. 3E, the heat dissipation vias 126 may be additionally formed in the heat dissipation channels 123, obtaining the heat dissipation channels 123 shown in FIG. 4D, where at least one heat dissipation via 126 is provided in each of the heat dissipation channels located below the groove and at left and right sides of the groove, so that the hot air in the heat dissipation channel 123 may exchange with the outside air and the thermal radiation generated by the light emitting element may be directed out of the frame 120, through not only the heat dissipation vents located at the left side surface 124 and the right side surface 125 of the frame 120 but also openings of the heat dissipation vias 126 at the second surface 121 of the frame 120.

Figure 4E:
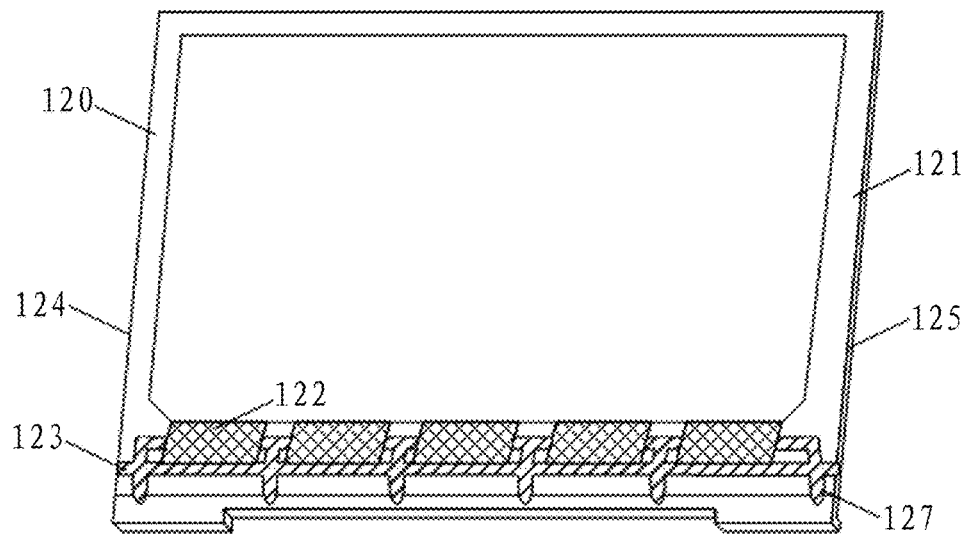
FIG. 4E is a schematic view showing the structure of a heat dissipation channel according to yet another embodiment of the present disclosure.

FIG. 4D shows the heat dissipation channels 123 in FIG. 3E which are additionally provided with heat dissipation vias, where the heat is dissipated through the openings of the heat dissipation vias at the second surface 121 of the frame 120. Herein, the first surface of the frame 120 is in contact with the reflection sheet 110, but is not entirely covered by the reflection sheet 110, therefore, as shown in FIG. 4E which is a schematic view showing the structure of yet another heat dissipation channel according to an embodiment of the present disclosure, heat dissipation slots 127 are formed to connect with the heat dissipation channels 123 located at the first surface of the frame 120, and the heat dissipation slots 127 open at a region of the first surface of the frame 120 which is not covered by the reflection sheet 110, to function as an air inlet to exchange the hot air with the outside air, so that the thermal radiation can be rapidly directed out of the frame 120 and heat dissipation is speeded up. For example, the heat dissipation channels 123 shown in FIG. 3E are additionally provided with heat dissipation slots 127 to form heat dissipation channels 123 as shown in FIG. 4E, where the dissipation channel 123 are further formed in the first surface at the periphery of the grooves 122, and open at a region of the first surface of the frame 120 which is not covered by the reflection sheet 110.

Figure 4F:
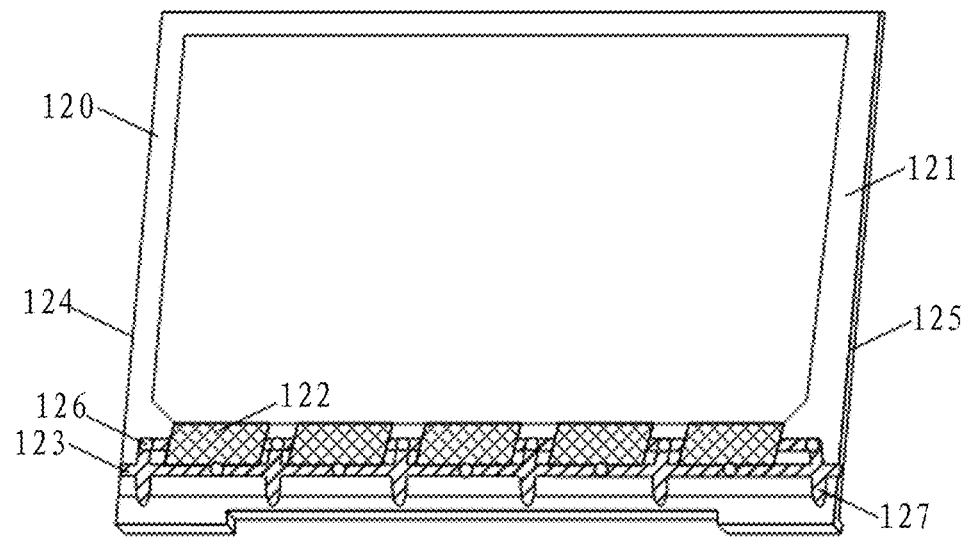
FIG. 4F is a schematic view showing the structure of a heat dissipation channel according to yet another embodiment of the present disclosure.

In combination the heat dissipation channel 123 shown in FIG. 4D with the heat dissipation channel 123 shown in FIG. 4E, FIG. 4F is a schematic view showing the structure of yet another heat dissipation channel according to an embodiment of the present disclosure, where the heat dissipation vias 126 are combined with the heat dissipation slots 127. Preferably, the heat dissipation channels 123 are further formed at the first surface of the frame 120 at the periphery of the groove 122, and open at a region of the first surface of the frame 120 which is not covered by the reflection sheet 110, and additionally, heat dissipation vias 126 penetrating through the first surface and the second surface 121 of the frame 120 are formed in the heat dissipation channels 123.

According to this embodiment of the present disclosure, the heat dissipation channel provided in the frame 120 runs across the frame 120 from the left side surface 124 to the right side surface 125 of the frame 120, and is also provided with heat dissipation vias 126 penetrating through the first surface and the second surface 121 of the frame 120, so that the thermal radiation generated by the light emitting element can be directed out of the frame 120 through the heat dissipation channel 123 and can also be directed to the second surface 121 of the frame 120, and the hot air around the light emitting element can be exchanged with the outside air via air convection, thereby improving the heat dissipation efficiency of the light emitting element.

Further, as described above, the heat dissipation vias 126 may be formed at the left and right sides of the groove 122 and/or below the grooves 122. In the case that the heat dissipation vias 126 are formed at the left and rights side of the groove 122, the area of the heat dissipation via 126 is less than the area between two adjacent grooves 122, that is, a part of the frame 120 should be present between two adjacent light emitting elements. In the case that the heat dissipation vias 126 are located below the grooves 122, the area of the heat dissipation via 126 is less than that of a part of the frame 120 below the grooves 122, to advantageously ensure the mechanical strength of the frame and the stability of the backlight module.

Further, in the case that the heat dissipation vias 126 are located below the grooves 122 and at the left and right sides of the groove 122, as long as the area of each of the heat dissipation vias 126 located at the left and right sides of the groove 122 is less than the area of the frame 120 between two adjacent grooves 122, the shape of the heat dissipation via 126 can be designed in any manner under the limitation of the area of the heat dissipation via 126. Here, the heat dissipation via 126 may have a shape from a group consisting of a circle shape, an elliptic shape, a square shape, a diamond shape and a hexagonal shape. Referring to FIG. 4D, the heat dissipation shape 126 has a circle shape.

As described above, the heat dissipation channel 123 may be provided on at least one of the first surface and the second surface 121 of the frame 120. If the heat dissipation channel 123 is provided on either the first surface or the second surface 121 of the frame 120, the depth of the heat dissipation channel 123 may be less than the thickness of the frame 120 between the first surface and the second surface 121 of the frame 120. Preferably, the depth of the heat dissipation channel 123 is no more than one third of the thickness of the frame 120 to avoid the fracture of the frame 120 and degradation of the strength of the frame 120. In the case that the heat dissipation channels 123 are formed at both the first surface and the second surface 121 of the frame 120, and the heat dissipation channel 123 located at the first surface of the frame 120 is arranged opposite to the heat dissipation channel 123 located at the second surface 121 of the frame 120 at the same position, the sum of the depths of these two heat dissipation channels 123 cannot exceed the thickness of the frame 120. In order to ensure the strength of the frame 120, preferably, the sum of the depths of these two heat dissipation channels 123 is less than one third of the thickness of the frame 120. In the case that the heat dissipation channels 123 are formed at both the first surface and the second surface 121 of the frame 120, and the heat dissipation channel 123 located at the first surface of the frame 120 and the heat dissipation channel 123 located at the second surface of the frame 120 are staggered away from each other in the frame 120, the depth of any of the heat dissipation channels 123 may be less than one third of the thickness of the frame 120. Referring to a plurality of the heat dissipation channels 123 shown in FIGS. 3A to 4F, the depth of the heat dissipation channel 123 is designed to be less than one third of the thickness of the frame 120.

Figure 5A:
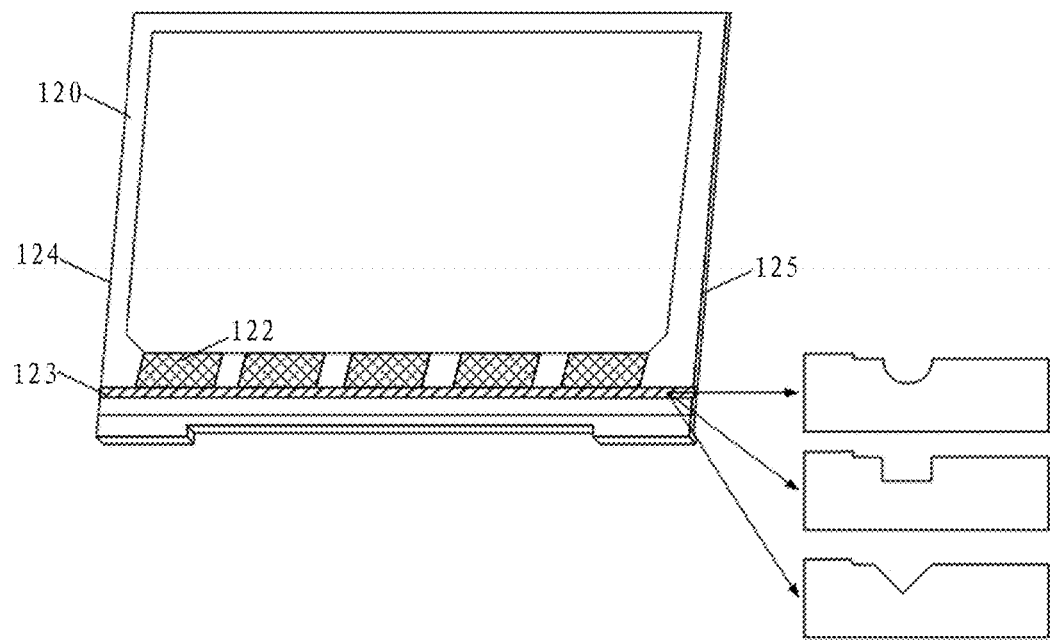
FIG. 5A is a schematic view showing the sectional structure of a heat dissipation channel according to yet another embodiment of the present disclosure.

Further, the cross-sectional shape of the heat dissipation channel 123 may be advantageously designed to increase the radiation area of the heat dissipation channel 123 and speed up the heat dissipation. FIG. 5A is a schematic view showing the sectional structure of a heat dissipation channel according to another embodiment of the present disclosure. As shown in FIG. 5A, the cross-section of the heat dissipation channel 123 has a semi-circle shape, but other shapes such as a square shape, a U shape or a V shape is also possible. Among others, the heat dissipation channel 123 with the semi-circle shape can achieve an optimal heat dissipation effect.

Figure 5B:
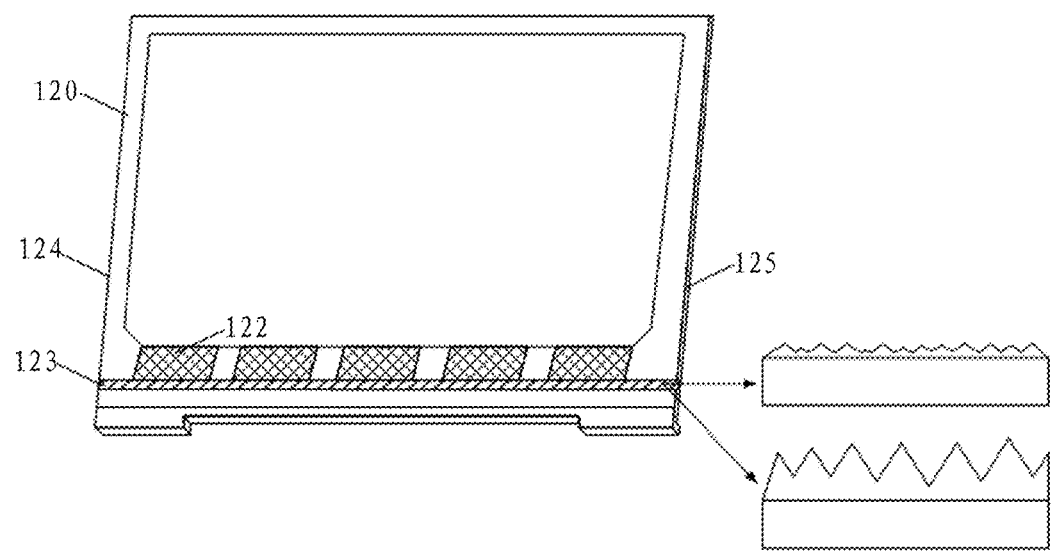
FIG. 5B is a schematic view showing the sectional structure of an internal surface of a heat dissipation channel according to sectional embodiment of the present disclosure.

Generally, a thermal radiation rate of an object varies with surface treatments for the object. The air has very small thermal conductivity, and hence functions as a contact thermal resistance when a plurality of light emitting elements generate heat radiation. Given the high contact thermal resistance in the heat dissipation channels 123, the heat dissipation effect of the heat dissipation channel 123 is poor if the internal surface of the heat dissipation channel 123 is smooth. Since the contact thermal resistance is inversely proportional to a contact area, the internal surface of the heat dissipation channel 123 may be designed to be rough to realize better heat dissipation. When the internal surface of the heat dissipation channel 123 is rough, the contact area for thermal radiation is increased, thereby achieving a better effect of the heat dissipation by the heat dissipation channel. Preferably, as shown in FIG. 5B which is a schematic view showing the sectional structure of an internal surface of a heat dissipation channel according to an embodiment of the present disclosure, the internal surface of the heat dissipation channel 123 has a high surface roughness or a low surface roughness.

Figure 5C:
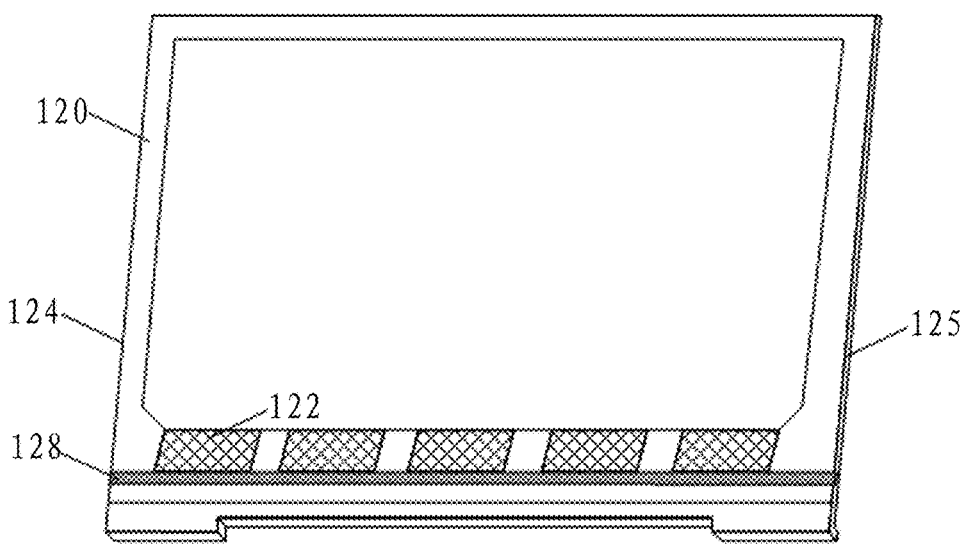
FIG. 5C is a schematic view of a film layer of the internal surface of a heat dissipation channel according to yet another embodiment of the present disclosure.

Since metallic material is thermally conductive, a metallic film layer can be adhesively attached to the internal surface of the heat dissipation channel 123 according to the embodiments of the present invention to accelerate the heat dissipation by the heat dissipation channel 123. Alternatively, the internal surface of the heat dissipation channel 123 can be coated with a thermally conductive layer to accelerate the heat dissipation by the heat dissipation channels 123. As a result, as shown in FIG. 5C which is a schematic view showing the structure of a film layer of an internal surface of the heat dissipation channel 123 according to an embodiment of the present disclosure, preferably the internal surface of the heat dissipation channel 123 is coated with a metallic film layer 128 or a thermally conductive coating layer.

The preferred embodiments of the present invention and the technical principles used therein have been described as above. It should be appreciated by those skilled in the art that the present invention is not limited to the particular embodiments described herein, and any apparent alterations, modification and substitutions can be made by those skilled in the art without departing from the scope of the present invention. Accordingly, while the present invention are described in detail through the above embodiments, the present invention is not limited to the above embodiments, and other equivalent embodiments can be derived without departing from the concept of the present invention. The scope of the present invention should be subject to the appended claims.

What is claimed is:

1. A backlight device, comprising:
    a frame, comprising a first surface and a second surface opposite to each other, and four sides, wherein a light emitting element is disposed next to a first side of the four sides;

a reflection sheet, disposed over and in contact with the first surface of the frame; and
a light guiding plate disposed on the second surface of the frame and surrounded by the frame;
wherein the second surface of the frame comprises:
a plurality of first grooves and a heat dissipation channel,
wherein the plurality of first groves are arranged between the light guiding plate and the first side of the frame, wherein a light emitting element is secured in each first groove,
the heat dissipation channel is configured to enhance thermal convention of the plurality of first grooves,
wherein the heat dissipation channel comprises:
a plurality of second grooves, a third groove and a plurality of fourth grooves,
wherein each first groove is provided with two second grooves disposed at opposite sides of the each first groove close to a second side and a fourth side of the frame, the second side and the fourth side of the frame are opposite to each other and adjacent to the first side of the frame, any two adjacent first grooves are connected via one of the plurality of second grooves,
wherein the third groove is formed between the plurality of first grooves and the first side of the frame,
wherein the plurality of fourth grooves connect respective ones of the plurality of second grooves to the third groove, any two adjacent fourth grooves of the plurality of fourth grooves and the third groove partially surround a respective first groove of the plurality of first grooves,
wherein the third groove extends to and opens on side surfaces at the second side and the fourth side of the frame.

2. The backlight device according to claim 1, wherein a heat dissipation via is formed in the heat dissipation channel to perforate through the first surface and the second surface of the frame; and
wherein the heat dissipation channel extends to and opens at a region of the first surface of the frame not overlapping the reflection sheet.

3. The backlight device of claim 2, wherein a top area of the heat dissipation via is less than an area of the frame between two adjacent first grooves.

4. The backlight device of claim 2, wherein a top of the heat dissipation via has a circle shape, an elliptic shape, a square shape, a diamond shape or a hexagonal shape.

5. The backlight device according to claim 1, wherein a depth of the heat dissipation channel is less than one third of a frame thickness between the first surface and the second surface.

6. The backlight device according to claim 1, wherein the heat dissipation channel has a cross-section of a semi-circle shape, a square shape, a U shape or a V shape.

7. The backlight device according to claim 1, wherein an internal surface of the heat dissipation channel has a high surface roughness.

8. The backlight device according to claim 1, wherein an internal surface of the heat dissipation channel is coated with at least one of: a metallic film layer and a thermally conductive coating layer.

9. The backlight device according to claim 1, wherein an internal surface of the heat dissipation channel has a low surface roughness.

10. A backlight device, comprising:
a frame, comprising a first surface and a second surface opposite to each other, and four sides, wherein a light emitting element is disposed next to a first side of the four sides;
a reflection sheet, disposed over and in contact with the first surface of the frame; and
a light guiding plate, disposed on the second surface of the frame and surrounded by the frame;
wherein the second surface of the frame comprises:
a plurality of first grooves and a heat dissipation channel,
wherein the plurality of first groves are arranged between the light guiding plate and the first side of the frame, wherein a light emitting element is secured in each first groove,
wherein the heat dissipation channel is configured to enhance thermal convention of the plurality of first grooves,
wherein the heat dissipation channel comprises:
a plurality of second grooves, a third groove and a plurality of fourth grooves,
wherein each first groove is provided with two second grooves disposed at opposite sides of the each first groove close to a second side and a fourth side of the frame, the second side and the fourth side of the frame are opposite to each other and adjacent to the first side of the frame, any two adjacent first grooves are connected via one of the plurality of second grooves,
wherein the third groove is formed between the plurality of first grooves and the first side of the frame,
wherein the plurality of fourth grooves connect respective ones of the plurality of second grooves to the third groove, any two adjacent fourth grooves of the plurality of fourth grooves and the third groove partially surround a respective first groove of the plurality of first grooves,
wherein one of the plurality of second grooves closest to the second side of the frame extends to and opens on a side surface at the second side of the frame and another one of the plurality of second grooves closest to the fourth side of the frame extends to and opens on a side surface at the fourth side of the frame.

* * * * *